United States Patent Office

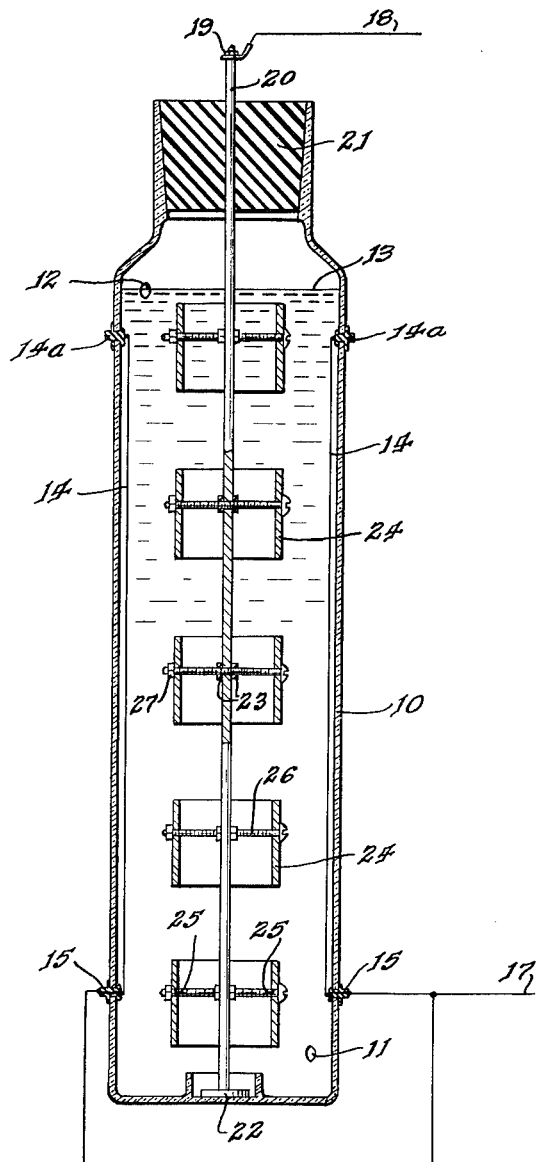

3,223,598
Patented Dec. 14, 1965

3,223,598
METHOD FOR DETERMINING THE ADHESION OF METAL PLATING
Germaine F. Jacky, Robert Sorenson, and Donald W. Shannon, Richland, Wash., and William E. Tragert, Scotia, N.Y., assignors to the United States of America as represented by the United States Atomic Energy Commission
Filed Nov. 23, 1962, Ser. No. 239,850
14 Claims. (Cl. 204—1)

The invention described herein was made in the course of, or under, a contract with the United States Atomic Energy Commission.

The invention relates to a novel method of determining the adhesion of metal plating and more particularly, of determining the adhesion of metal plated nuclear reactor fuel cladding tubes and other reactor components.

In the design and operation of nuclear reactors it is important to be able to determine in advance the serviceability of metal components such as the cladding tubes used to encase the fissionable fuel. Because of the severe and unusual conditions within such reactors, ordinary tests often lead to results that are quite misleading. Water under pressure at 360° C., for example, becomes so dissociated that it takes on a pH of between 5 and 6, and at such a temperature an acid of this character acts as quite a strong reagent.

In order to predict the behavior of materials used for reactor components, tests have been devised to simulate reactor conditions. Large scale pressure vessels, or autoclaves, are employed to duplicate the conditions of temperature, pressure, acidity, and humidity encountered within reactors, and samples of material proposed for reactor use are tested within these for periods of time extending in some cases over several months in order to be sure that the materials are reliable.

While autoclave tests have given useful results with respect to corrosion of materials, they failed, for some unknown reason, to adequately test plate or coating adhesion. Plated cladding material such as nickel-plated aluminum, for example, might resist corrosion well in autoclaves but fail quite soon after being placed in a reactor due to separation of the plate from the substrate. All attempts to make the conditions within the autoclaves conform more closely to those within the reactor led to little, if any, discernible improvement.

Adhesion may be measured quantitatively by several methods, employing tabs or studs which are attached to the coating surface. These tabs or studs are then pulled on a testing machine, and the tensile or shear force required to separate the substrate from coating is measured. A chief disadvantage of these methods is that the tab or stud must generally be attached by welding or soldering to measure good adhesion. This heat treatment may alter the strength of the coating-substrate bond, and results may be again misleading. The area examined is generally very small compared to the total coated area.

Other methods such as the "Ollard Test" and modifications thereof require samples of a specific configuration which may or may not duplicate results obtained on a large number of parts having a different geometry and coating thickness.

It would be possible, of course, to test plated materials by placing them in actual reactors for test runs, and up until the present invention, this was, in fact, the only reliable testing method known. However, this method is obviously expensive and inconvenient since it requires valuable space within a reactor to carry it out, and after it has been carried out the materials are highly radioactive and have to be handled by remote control.

It is, accordingly, an object of the invention to provide a convenient, economical method for quantitatively testing the adhesion of metallic or other coating to substrate materials.

It is a more particular object to provide a method for testing the adhesion of plate to a substrate for use in a nuclear reactor without actually placing the material within a reactor.

It is a further object to provide an apparatus for carrying out the above methods.

It is still another object of the present invention to provide a general purpose method for testing for the adherence of a coating to its substrate.

Other objects will appear as the description of the invention proceeds.

The foregoing objects are attained by our discovery that the major cause of failure in nuclear reactors of plated material such as nickel plate is not, as in the case of alloys, direct chemical attack, but the physical separation of the plating from the substrate. While we do not wish to be rigorously bound by any theoretical explanation of our invention, we believe that the radiation in the reactor produces atomic hydrogen by radiolysis of the coolant or moderator water. The atomic hydrogen then diffuses through the plating metal, and if it reaches a region where the plating and the substrate are not adherent, (that is, where a void or foreign material is present) it accumulates and returns to the molecular state. This process continues, and with accumulation of gas, the pressure increases sufficiently to cause enlargement of the volume and formation of a "blister" which breaks through the plating. The discontinuity thus created permits the water to come into contact with the substrate, and corrosion follows in the ordinary way. This explains why the failures of plated specimens, especially nickel-plated aluminum tube samples, occur in localized areas; in many cases the ruptured "blisters" are easily discernible to the unaided eye, and the blistering is most pronounced when the plating is of a metal pervious to atomic hydrogen such as nickel, and the substrate is relatively impervious to it, like aluminum. This combination of properties, along with the further fact that nickel is not pervious to molecular hydrogen, substantiate our explanation that the mechanism of plating failure is primarily physical due to the blistering by hydrogen diffusing through the plating in the atomic state, and later recomposing into the molecular state in a localized fashion beneath the plating. It explains why plated specimens were able to withstand the rigorous conditions of autoclave tests where only conditions of direct chemical attack were simulated, and then failed under actual reactor conditions.

We have made the further discovery that in testing plated specimens in order to predict their behavior under reactor conditions, it is not necessary to reproduce all the conditions in a reactor. The high temperature, pressure, and radiation may all be dispensed with, and all that is necessary is to expose the plated surfaces to atomic hydrogen for a period of time. This, we have found, can be economically done by making the specimens part of the cathode of an electrolytic cell and under certain conditions of pH and electrolyte composition, electrolysis will generate atomic hydrogen to bring about plate detachment so closely resembling the phenomenon brought about in nuclear reactors that it serves as a reliable test for what will take place in the latter.

Since our invention is predicated upon testing the adherence of the plating and using this as a measure of serviceability under actual reactor operations, it obviously has application as a general purpose method of testing for plating adherence, whether the plating is intended for reactor use or not. Many of the present methods of testing plating adherence, such as bending tests, peeling tests, and the like are not altogether satisfactory even for nonnuclear purposes.

In the drawing the only figure is a sectional view of the electrolytic cell used to carry out our invention.

Reference numeral 10 designates a glass cell vessel having a flowing electrolyte inlet 11, and an electrolyte outlet 12. The electrolyte's level is shown at 13; it is to be understood that the term "electrolyte" is used in this application in the electrochemical sense meaning the aqueous solution with its dissolved solutes rather than in the pure chemistry sense which refers to the solutes only. Along the vertical sides of the vessel 10 are a plurality of anode wires 14 which depend from closed seals 14a and which leave the vessel 10 through lead-in seals 15, whence they connect through distribution network wires 16 to positive supply lead wire 17.

Negative supply wire 18 is connected by setscrew 19 to cathode support rod 20 which extends through stopper 21 axially down the length of the cell and rests on the bottom of the cell vessel 10 by means of foot 22.

Along the length of cathode support rod 20, at approximately equal intervals, diametrically opposed pairs of nuts 23 are positioned in alignment with bores through the rod 20 (not shown). Samples of plated tubes 24, having diametrically opposed bored holes 25, are placed in alignment with the pairs of nuts 23. Bolts 26 are inserted through holes 25 and nuts 23, and nuts 27 are then threaded on bolts 26 and tightened, thereby making a firm physical and electrical connection between samples 24 and the cathode rod 20, so that the samples 24 become, in effect, integral with the cathode of the cell.

A source of direct electric current (not shown) delivers positive current in the conventional sense to the positive supply lead wire 17, and a corresponding current of electrons to the negative supply lead wire 18.

Since the mechanism of our method of testing is to produce hydrogen on the surface of the plating being tested, it might be expected that a highly acidic electrolyte would be preferable, since such an electrolyte contains a high concentration of hydrogen ions capable of being reduced to atomic hydrogen. Surprisingly, we have found this not to be the case; when the pH is no lower than 4, which is equivalent to an acidity of only 0.001 N, blistering stops completely, and the same is true when the pH rises to 10. Between these points the invention is operable, with the blistering reaching a maximum at around 7, or neutrality. We prefer as an operating range a pH of $7.0 \pm 0.1$, or from about 6.9 to about 7.1.

In addition to its pH requirements, the electrolyte of the cell should contain no cations that would plate out preferentially to hydrogen; hence, all cations in the electrolyte should be at least as high as hydrogen in the electromotive series. Preferably the cations should be, in addition to hydrogen, those of one or more of the alkali or alkaline earth metals, sodium being preferred because of its availability and cheapness, although, of course, potassium, magnesium and the like would serve if their salts were soluble. The anions should be those of a comparatively weak acid such as acetic, carbonic, or any other having a dissociation constant within the range of $n \times 10^{-7}$ to $n \times 10^{-5}$, $n$ being a number less than 10.

The electrolyte solute or solute mixture should have a normality on the order of $n \times 10^{-1}$, $n$ being a number less than 10, in a salt of the class above described, adjusted with an acid, preferably having the same anion as the salt, to bring the electrolyte within the pH range above set forth. Examples which have been tried and found satisfactory are 0.1 N sodium acetate adjusted to a pH of $7.0 \pm .1$ with acetic acid, and 0.1 N sodium bicarbonate adjusted with carbonic acid in the same way.

Since the electrolytic cell is operated over a period of several hours, it is necessary that the electrolyte be renewed in order to keep its concentrations constant; such renewal has the additional advantage of controlling the corrosion of aluminum, which is increased by a fall of the pH. The rate of electrolyte flow through the cell will, of course, depend on the extent of the electrolysis, which, in turn, is dependent on the area of the electrodes and the current density. We have found current densities ranging from about one to about six-and-a-half milliamperes per square centimeter of the plated samples being tested to give good results; above this range direct chemical attack takes place, and below it the process is undesirably slow. We prefer to carry out the electrolysis for about sixteen hours.

The electrolysis is carried out at room temperature and at atmospheric pressure. Studies were made of the effects of carrying it out at 81° C., but no significant differences were found.

As soon as the electrolysis is completed, the cathode should either be removed at once or the external circuit opened, or else the samples will become anodic and corroded galvanically, which will give misleading results in predicting corrodibility of the kind being tested.

Our invention is useful not only in the exact situations already described, but in many others of the same general nature. It may be used to test not only plated elements for use in reactors having aqueous coolants or moderators, but also elements to be used in reactors having organic coolants and moderators, since these are subject to some extent to radiolysis under irradiation, with consequent evolution of hydrogen. It may be used in any situation where corrosion is wholly or partly due to hydrogen evolution, whether in a nuclear reactor or not, and it is also a general adherence test for plated materials in general, regardless of what the cause for nonadherence may be.

In addition to testing adherence of nickel plate on aluminum, our invention may be used to test the adherence of a wide variety of combinations of plating and substrate; the only requirements are that the substrate be relatively impermeable to atomic hydrogen, while the plating be permeable to it. Among plating materials meeting these qualifications, in addition to nickel, are platinum, palladium, cobalt and iron. Among substrate materials meeting the qualifications mentioned for substrates, in addition to aluminum, are chromium, molybdenum, tungsten, and magnesium.

It is possible to eliminate the factor of human judgment in carrying out our invention if that is deemed advisable. Instead of electrolyzing plating samples for a predetermined or set period of time and evaluating the relative amount of blistering visually, the test can be made by placing a current measuring device, such as a coulometer, in the power supply circuit to the electrolytic cell, and at the first appearance of blistering or other predetermined change such as the first pitting on the sample, the reading on the current measuring device may be recorded. The degree of nonadherence of the plating, will then be a function of the recorded current, and if a number of different samples are tested together their comparative recorded currents at first appearance of blistering or other such change will bear an inverse relationship to their respective plate adhesion. The current measuring device, of course, need not be of the direct measuring type such as a coulometer, but may be indirect such as a timer if the current is maintained constant. In the latter case, plate adhesion will be an inverse function of time as recorded from the timer. In any of these variations, the evaluation of adhesion of the plating is shown in the recorded reading of the instrument used.

Another test method is to make up a series of standard specimens with increasing degrees of nonadherence ranging from blistering as it first appears to severe, or almost complete plate detachment. The sample being tested is then electrolyzed for a predetermined period of time, and at the end of the period is placed adjacent members of the series of samples until a member is found that matches the degree of plate adhesion of the sample being tested. This makes the evaluation of adhesion as certain as colorimetric methods of chemical analysis and those of equal turbidity, which are regarded as reliable not only qualitatively, but quantitatively as well.

A third quantitative method of evaluating plate adhesion is by measurement of the percentage of a surface area that has blistered after being subjected to standardized test conditions of time and current density in a standardized electrolyte. Measurement of the blistered surface area can be rapidly carried out by covering the surface with coordinately ruled transparent material. Quantitative results of this type are readily usable as acceptance specifications, and further, standard statistical evaluations may be readily applied.

EXAMPLE I

A cell of the type shown in the drawing consisted of a glass cylindrical tube 15½ inches long with a 70 mm. inner diameter. The flowing electrolyte outlet was placed close to the top and allowed the electrolyte to have a 13-inch liquid depth.

Eight cylindrical samples of nickel plating on aluminum of varying thicknesses from 0.001 inch to 0.005 inch each about one inch long and with an outer diameter of approximately 40 mm., were evenly placed on the cathode rod 20, leaving about ½ inch between them. The distance of the anodes from the edges of the samples was from about 15 to 20 mm.

The electrolyte solution was 0.1 M sodium acetate adjusted to a pH of $7.0 \pm 0.1$ with acetic acid. This was renewed at a flow rate of 300 milliliters per hour.

A direct current was led into the anode of the cell and out the cathode of .5 ampere, which is equivalent to about 0.98 milliampere per $cm.^2$ of the samples. The current generated hydrogen over the surfaces of the samples, and was continued for 16 hours at the room temperature of 26° C.

At the end of the test the samples were promptly withdrawn and their degree of blistering examined. It was found to be in good agreement with the blistering produced in actual nuclear reactor operation of samples of the corresponding kinds of plating.

EXAMPLES II TO V

In order to compare the effects of varying temperatures and time in carrying out the testing method of the invention, and also to compare the relative adhesion of different thicknesses of nickel plating on aluminum supplied by different vendors, treated after plating in various ways, a series of tests were run using the cell described in Example I, all conditions being the same as in that example, except where specified otherwise. In the following tables "H.T." means heat-treated at the temperature specified; "A.C." means autoclaving at 300° C.; "control" means a sample neither heat-treated nor autoclaved; "thick" means that the nickel plating was 0.004 to 0.005 inch thick; "thin" means that the nickel plating was 0.001 to 0.002 inch thick; and the "Score" in the extreme right column is on an arbitrarily chosen scale in which zero indicates no visible blistering, 1 indicates slight blistering, 2 indicates substantial blistering in limited areas, and 3 indicates blistering over substantially the entire sample, which is often accompanied by pitting due to rupturing of the blisters.

*Table I*

ELEVATED TEMPERATURE VS. ROOM TEMPERATURE
[Effect of nickel thickness and post plating in also shown]

| Vendor | Nickel thickness | Post plating treatment | Temp., °C. | Score |
|---|---|---|---|---|
| Vendor No. 1 | Thick | Control | 81 | 1 |
|  |  | H.T., ½ min. at 500° C |  | 2 |
|  |  | H.T., 5 min. at 500° C |  | 2 |
|  |  | A.C. |  | 1 |
| Vendor No. 2 | Thick | Control | 26 | 3 |
|  |  | H.T., ½ min. at 500° C |  | 3 |
|  |  | H.T., 5 min. at 500° C |  | 1 |
|  |  | A.C. |  | 1 |
| Vendor No. 1 | Thin | Control | 81 | 2 |
|  |  | H.T., ½ min. at 500° C |  | 2 |
|  |  | H.T., 5 min. at 500° C |  | 3 |
|  |  | A.C. |  | 1 |
| Vendor No. 2 | Thin | Control | 26 | 1 |
|  |  | H.T., ½ min. at 500° C |  | 3 |
|  |  | H.T., 5 min. at 500° C |  | 3 |
|  |  | A.C. |  | 1 |
| Vendor No. 1 | Thick | Control | 81 | 1 |
|  |  | H.T., 3 min. at 400° C |  | 0 |
|  |  | H.T., 6 min. at 400° C |  | 0 |
|  |  | A.C. |  | 0 |
| Vendor No. 2 | Thick | Control | 26 | 3 |
|  |  | H.T., 3 min. at 400° C |  | 1 |
|  |  | H.T., 6 min. at 400° C |  | 1 |
|  |  | A.C. |  | 1 |

Table II

EFFECT OF HEAT TREATMENT (TEMPERATURE AND TIME) AUTOCLAVING AND NICKEL THICKNESS

| Vendor | Nickel thickness | Post plating treatment | Score |
|---|---|---|---|
| Vendor No. 1 | Thin | Control | 2 |
| | | H.T., 3 min. at 300° C | 1—pitting |
| | | H.T., 6 min. at 300° C | 0 |
| | | A.C. | 1—pitting |
| Vendor No. 1 | Thick | Control | 1 |
| | | H.T., 3 min. at 300° C | 1—pits |
| | | H.T., 6 min. at 300° C | 0 |
| | | A.C. | |
| Vendor No. 2 | Thin | Control | 3 |
| | | H.T., 3 min. at 400° C | 1—pitting |
| | | H.T., 6 min. at 400° C | 1—pitting |
| | | A.C. | 2 |
| Vendor No. 2 | Thick | Control | 3 |
| | | H.T., 3 min. at 400° C | 1—pits only |
| | | H.T., 6 min. at 400° C | 1—pits only |
| | | A.C. | 1 |
| Vendor No. 1 | Thin | Control | 1 |
| | | H.T., 3 min. at 500° C | 3—severe pitting |
| | | H.T., 6 min. at 500° C | 3—severe pitting |
| | | A.C. | |
| Vendor No. 1 | Thick | Control | 2 |
| | | H.T., 3 min. at 500° C | 1—pitting |
| | | H.T., 6 min. at 500° C | 1—pitting |
| | | A.C. | 0 |
| Vendor No. 2 | Thick | Control | 2 |
| | | H.T., 10 min. at 300° C | 0 |
| | | A.C. | 0 |
| Vendor No. 2 | Thick | Control | 2 |
| | | H.T., 10 min. at 400° C | 0 |
| | | A.C. | 0 |

Table III

EFFECT OF COMBINING HEAT TREATMENT AND AUTOCLAVING

| Vendor | Nickel thickness | Post plating treatment | Score |
|---|---|---|---|
| Vendor No. 2 | Thin | Control | 3 |
| | | H. T., 10 min. at 400° C | 2 |
| | | A. C. | 2 |
| | | H. T., 10 min. at 400° C., then A. C. | 1 |
| | | A. C., then H. T., 10 min. at 400° C | 0 |
| | | Control | 3 |
| | | H. T., 5 min. at 400° C., then A. C. | 1 |
| | | A. C., then H. T., 5 min. at 400° C | 1 |
| Vendor No. 2 | Thick | Control | 3 |
| | | H. T., 10 min. at 400° C | 1 |
| | | A. C. | 1 |
| | | H. T., 10 min. at 400° C., then A. C. | 1 |
| | | A. C., then H. T., 10 min. at 400° C | 0-1 |
| | | Control | 3 |
| | | H. T., 5 min. at 400° C., then A. C. | 1 |
| | | A. C., then H. T., 5 min. at 400° C | 1 |
| Vendor No. 3 | Thin | Control | 1 |
| | | H. T., 10 min. at 400° C | 1 |
| | | A. C. | 1 |
| | | H. T., 10 min. at 400° C., then A. C. | 1 mostly pits |
| | | A. C., then H. T., 10 min. at 400° C | 1 |
| | | Control | 1 |
| | | H. T., 5 min. at 400° C., then A. C. | 1 |
| | | A. C., then H. T., 5 min. at 400° C | 1 |
| Vendor No. 3 | Thick | Control | 2 |
| | | H. T., 10 min. at 400° C | 1 |
| | | A. C. | 1 |
| | | H. T., 10 min. at 400° C., then A. C. | 1 mostly pits |
| | | A. C., then H. T., 10 min. at 400° C | 1 |
| | | Control | 1 |
| | | H. T., 5 min. at 400° C., then A. C. | 1 |
| | | A. C., then H. T., 5 min. at 400° C | 1 |
| Vendor No. 4 | Thin | Control | 2 |
| | | H. T., 10 min. at 400° C | 2 |
| | | A. C. | 2 |
| | | H. T., 10 min. at 400° C., then A. C. | 2 mostly pits |
| | | A. C., then H. T., 10 min. at 400° C | 2 |
| | | Control | 2 |
| | | H. T., 5 min. at 400° C., then A. C. | 2 |
| | | A. C., then H. T., 5 min. at 400° C | 2 |
| Vendor No. 4 | Thick | Control | 3 |
| | | H. T., 10 min. at 400° C | 2 |
| | | A. C. | 2 |
| | | H. T., 10 min. at 400° C., then A. C. | 1 mostly pits |
| | | A. C., then H. T., 10 min. at 400° C | 2 |
| | | Control | 2 |
| | | H. T., 5 min. at 400° C., then A. C. | 1 |
| | | A. C., then H. T., 5 min. at 400° C | 3 |

Table IV

EXTEND EXPOSURE TIME

| Vendor and thickness | Post plating treatment | Exposure time | | | |
|---|---|---|---|---|---|
| | | 16 hr. | 21 hr. | 38 hr. | 45 hr. |
| | | Score | | | |
| Vendor No. 2 (Thin) | Control | 3 | 3 | 3 | 3 |
| | H. T., 10 min. at 400° C | 2 | 2 | 2 | 2 |
| | A. C. | 2 | 1 | 1 | 2 |
| | H. T., 10 min. at 400° C., then A. C. | 1 | 1 | 1 | 2 |
| | A. C., then H. T., 10 min. at 400° C. | 0 | 0 | 1 | 1 |
| | Control | 3 | 3 | 3 | 3 |
| | H. T., 5 min. at 400° C., then A. C. | 1 | 1 | 1 | 2 |
| | A. C., then H. T., 5 min. at 400° C. | 1 | 1 | 1 | 2 |
| Vendor No. 2 (Thick) | Control | 3 | 3 | 3 | 3 |
| | H. T., 10 min. at 400° C. | 1 | 2 | 2 | 2 |
| | A. C. | 1 | 1 | 1 | 2 |
| | H. T., 10 min. at 400° C., then A.C. | 1 | 1 | 1 | 2 |
| | A. C., then H. T., 10 min. at 400° C. | 0–1 | 1 | 1 | 2 |
| | Control | 3 | 3 | 3 | 3 |
| | H. T., 5 min. at 400° C., then A. C. | 1 | 1 | 1 | 2 |
| | A. C., then H. T., 5 min. at 400° C. | 1 | 1 | 1 | 2 |

The foregoing tables illustrate the versatility of the testing method of the invention. Table I shows the general superiority of "thick" plating over thin, the generally favorable results from heat treating and autoclaving, and the superiority in most cases of the material supplied by Vendor No. 1 over that of Vendor No. 2. Table II shows 6 to 10 minutes of heat treating of plated material brings about better results than heat treatment for shorter periods or at higher temperature; it also indicates that autoclaving of "thick" plate gives better results than for "thin" plate. Table III indicates that of various combinations of heat treatment and autoclaving, autoclaving followed by ten minutes of heat treating at 400° C. gives best results for the material of Vendors Nos. 2 and 4, but results were inconclusive for the material of Vendor No. 3. Table IV confirms the results of Table III as to the material from Vendor No. 2. All the foregoing results are in agreement with experience with similar plated materials under actual reactor conditions.

It will be understood that this invention is not to be limited to the details given herein, but that it may be modified within the scope of the appended claims.

What is claimed is:

1. A method for determining the adhesion of metal plating permeable to atomic hydrogen to a substrate substantially impermeable to atomic hydrogen comprising electrolytically generating only hydrogen on the surface of the plating in an electrolytic cell having the metal plated piece as its cathode by passing a predetermined constant total amount of direct current electricity between the anode and the cathode of said cell, and quantitatively measuring the amount of blistering of the plating.

2. A method of determining the adhesion of metal plating permeable to atomic hydrogen, plated on a piece of substrate material substantially impermeable to atomic hydrogen comprising making the piece together with the plating integral with the cathode of an electrolytic cell having an electrolyte containing only cations at least as high in the electromotive series as hydrogen and incapable of plating out in preference to hydrogen, passing a predetermined constant total amount of direct current electricity from the anode to the cathode of the cell, thereby generating only hydrogen on the surface of the plating, and quantitatively measuring the amount of blistering of the plating.

3. The method of claim 2 where the pH of the electrolyte is between 4 and 10.

4. The method of claim 2 where the pH of the electrolyte is between 6.9 and 7.1.

5. The method of claim 2 where the electrolyte has a normality of $n \times 10^{-1}$, $n$ being a number less than 10, in a salt having a cation of the class consisting of the alkali and alkaline earth metals, and an anion of an acid having a dissociation constant of from $n \times 10^{-7}$ to $n \times 10^{-5}$, $n$ being a number less than 10.

6. The method of claim 2 where the electrolyte is adjusted to within a pH range of 4 to 10 by means of an acid having a dissociation constant of from $n \times 10^{-7}$ to $n \times 10^{-5}$, $n$ being a number less than 10.

7. The method of claim 2 where the electrolyte is maintained at 0.1 normal in sodium acetate, adjusted to a pH of from about 6.9 to about 7.1 by acetic acid.

8. The method of claim 2 where the plating is predominantly nickel and the substrate material is predominantly aluminum.

9. A method for determining the adhesion of a metal plated piece having a plating permeable to atomic hydrogen and a substrate substantially impermeable to atomic hydrogen, comprising electrolytically generating only hydrogen on the surface of the piece in an electrolytic cell having the metal plated piece as its cathode by passing a constant direct current between the anode and cathode of the cell, and recording the amount of time during which the electric current has passed through the electrolytic cell until the first appearance of blistering in the piece.

10. The method of claim 2 where the measuring is done by placing the piece adjacent to the members of a series of standard samples of increasing degrees of corrosion until a member is found whose corrosion matches that of the said piece.

11. A method for determining the relative serviceability of a plurality of metal plated nuclear reactor tubes under conditions of hydrogen evolution due to radiolysis, the said tubes having substrate metal substantially impermeable to atomic hydrogen and plating metal permeable to atomic hydrogen comprising cutting samples from the tubes, connecting them together electrically to form the cathode of an electrolytic cell having an electrolyte containing only cations at least as high in the electromotive series as hydrogen and incapable of plating out in preference to hydrogen, passing a constant direct electric current from the anode to the cathode of the cell, thereby generating only hydrogen on the metal plated surfaces of the samples, continuing to pass said current for a sufficient time to cause blistering of the plating on the samples, and quantitatively measuring the amount of blistering of the plating on the samples.

12. The method of claim 11 where the amount of blistering of each of the samples is quantitatively measured by covering its surface with coordinately ruled transparent material and counting the number of blisters on a ruled area of known dimensions.

13. The method of claim 11 wherein the quantitative measuring is done by passing said constant current through the samples for a predetermined length of time thereby subjecting the samples to a predetermined constant quantity of electricity and then determining the surface area which has blistered on each sample.

14. A method for determining the adherence of a plating of metal of the class consisting of nickel, cobalt, iron, platinum, and palladium to a substrate of the class consisting of aluminum, chromium, molybdenum, tungsten, and magnesium, comprising electrolytically generating only hydrogen on the surface of the plating in an electrolytic cell having the metal plated piece as its cathode by passing a predetermined constant total amount of direct current electricity between the anode and the cathode of said cell, and quantitatively measuring the amount of blistering of the plating.

References Cited by the Examiner

UNITED STATES PATENTS

| | | | |
|---|---|---|---|
| 1,818,579 | 8/1931 | Pfleiderer | 204—129 |
| 2,482,308 | 9/1949 | Werlund | 204—40 |
| 2,798,036 | 7/1957 | Utz | 204—40 |
| 2,844,530 | 7/1958 | Wesley et al. | 204—40 |
| 2,970,090 | 1/1961 | Withers | 204—40 |
| 3,062,726 | 11/1962 | Hill | 204—40 |
| 3,090,733 | 5/1963 | Brown | 204—49 |

OTHER REFERENCES

"Chemical Age," January 3, 1959, page 9.

JOHN H. MACK, *Primary Examiner.*

MURRAY A. TILLMAN, WINSTON A. DOUGLAS,
*Examiners.*